US008478945B2

(12) United States Patent
Ash et al.

(10) Patent No.: US 8,478,945 B2
(45) Date of Patent: Jul. 2, 2013

(54) DYNAMIC MANAGEMENT OF DESTAGE TASKS IN A STORAGE CONTROLLER

(75) Inventors: Kevin John Ash, Tucson, AZ (US); Lokesh Mohan Gupta, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 371 days.

(21) Appl. No.: 12/697,385

(22) Filed: Feb. 1, 2010

(65) Prior Publication Data

US 2011/0191534 A1    Aug. 4, 2011

(51) Int. Cl.
*G06F 12/00* (2006.01)

(52) U.S. Cl.
USPC .............. 711/143; 711/159; 711/118

(58) Field of Classification Search
USPC .................................. 711/118, 159
See application file for complete search history.

(56) References Cited

U.S. PATENT DOCUMENTS

| | | | |
|---|---|---|---|
| 5,452,420 A * | 9/1995 | Engdahl et al. | 710/105 |
| 6,775,738 B2 | 8/2004 | Ash | |
| 6,785,771 B2 | 8/2004 | Ash | |
| 7,062,608 B2 | 6/2006 | Le Moal | |
| 7,159,071 B2 * | 1/2007 | Ikeuchi et al. | 711/112 |
| 7,191,207 B2 | 3/2007 | Blount | |
| 7,496,714 B2 | 2/2009 | Gill | |
| 2003/0037204 A1 | 2/2003 | Ash et al. | |
| 2006/0294301 A1 | 12/2006 | Zohar et al. | |
| 2008/0126708 A1 | 5/2008 | Gill et al. | |

FOREIGN PATENT DOCUMENTS

| | | |
|---|---|---|
| JP | 06-004401 A | 1/1994 |
| JP | 08-329260A A | 12/1996 |
| JP | 08-244955 A | 9/1997 |
| JP | 2004-295860 A | 10/2004 |
| JP | 2008-077152 A | 4/2008 |

OTHER PUBLICATIONS

Anujan Verma et al, "Destage Algorithms for Disk Arrays with Non-Volatile Caches", IEEE Trans. on Computers, Feb. 1998 (vol. 47 No. 2) pp. 228-235.
Anujan Varma et al., "Destage Algorithms for Disk Arrays with Nonvolatile Caches," IEEE Transactions on Computers, vol. 47, No. 2, Feb. 1998, pp. 228-235.

* cited by examiner

*Primary Examiner* — Reginald Bragdon
*Assistant Examiner* — Larry Mackall
(74) *Attorney, Agent, or Firm* — Eric A Gifford

(57) ABSTRACT

Method, system, and computer program product embodiments for facilitating data transfer from a write cache and NVS via a device adapter to a pool of storage devices by a processor or processors are provided. The processor(s) adaptively varies the destage rate based on the current occupancy of the NVS for a particular storage device and stage activity related to that storage device. The stage activity includes one or more of the storage device stage activity, device adapter stage activity, device adapter utilized bandwidth and the read/write speed of the storage device. These factors are generally associated with read response time in the event of a cache miss and not ordinarily associated with dynamic management of the destage rate. This combination maintains the desired overall occupancy of the NVS while improving response time performance.

19 Claims, 9 Drawing Sheets

DYNAMIC MANAGEMENT OF DESTAGE TASKS IN A STORAGE CONTROLLER

BACKGROUND

1. Field of the Invention

The present invention relates to computer systems, and more specifically, to management of destage tasks in a storage controller.

2. Description of the Related Art

High end storage controllers, such as the International Business Machines Corporation (IBM®) Enterprise Storage Server manage Input/Output (I/O) requests from networked hosts to a pool of storage devices, such as a direct access storage device (DASD), Redundant Array of Independent Disks (RAID Array), and Just a Bunch of Disks (JBOD). Storage controllers include one or more host bus adapter (HBA) cards to communicate with one or more hosts over a network and device adapters (DAs) to communicate with the storage devices. The storage controllers also include a cache memory and a non-volatile storage device (WS), which may be comprised of a battery backed-up random access memory.

Caching is a fundamental technique in hiding I/O latency and is widely used in storage controllers, file systems, and operating systems. The Storage Networking Industry Association (SNIA) defines a cache as "a high speed memory or storage device used to reduce the effective time required to read data from or write data to a lower speed memory or device." Hereinafter, cache techniques will be discussed in the context of a storage controller wherein fast, but relatively expensive, random access memory is used as a cache for slow, but relatively inexpensive, disks or storage devices. The cache memory is used for rapid access to data inpaged (staged) from external storage to service read data access requests from memory and to provide buffering of modified data. Write requests are written to the cache and mirrored in the NVS and then written (destaged) to the external storage devices.

Read cache management is a well-studied discipline. There are a large number of cache replacement techniques in this context, see, for example, LRU, CLOCK, FBR, LRU-2, 2Q, LRFU, LIRS, MQ, ARC, and CAR.

Write cache management is a developing discipline. NVS was introduced to enable fast writes. Generally, in the absence of NVS, every data write must be synchronously written (destaged) directly to the storage device to ensure consistency, correctness, durability, and persistence. Otherwise failure of the server may lose cache and result in a loss of data. Generally the rate of host writes exceeds the speed of the storage devices, hence without NVS data transfer would bottleneck. NVS enables fast writes to cache wherein the writes are mirrored to and stored safely in the NVS until transfer to the external storage device. The data is destaged from cache later (and discarded from NVS) in an asynchronous fashion thus hiding the write latency of the storage device. The cache and NVS typically store updates intended for multiple storage devices. To guarantee continued low latency for writes, the data in the NVS must typically be drained so as to ensure that there is always some empty space for incoming writes; otherwise, follow-on writes will become effectively synchronous, which may adversely impact the response time for host writes. On the other hand, if the writes are drained too aggressively, then one generally cannot fully exploit the benefits of write caching since the average amount of NVS cache utilized will be typically low. Cache is cheaper and much bigger than NVS so NVS is the bottleneck in destaging of write data.

Some destaging techniques use a linear thresholding scheme that limits the occupancy of the NVS for a particular storage device to prevent failure of a single storage device from affecting all of the devices. Other techniques dynamically vary the rate of destages to storage devices based on the overall occupancy of the NVS and the occupancy associated with each storage device. Writing at full throttle regardless of the rate of new writes, is generally non-ideal for performance and reduces the maximum write throughput obtainable from the storage controller. Desired behavior is simply to keep up with the incoming write load (i.e., write requests) while keeping the NVS largely occupied without filling up the NVS. The higher the NVS occupancy the more effective the write cache is, as it can absorb more writes to the same logical addresses, hence the more efficient the throughput of data to the storage devices.

BRIEF SUMMARY

In view of the foregoing, various method, system, and computer program product embodiments for facilitating data transfer from a write cache and NVS via a device adapter to a pool of storage devices by a processor or processors are provided. The processor(s) adaptively varies the destage rate based on the current occupancy of the NVS related to a particular storage device and stage activity related to that storage device. The stage activity includes one or more of the storage device stage activity, device adapter stage activity, device adapter utilized bandwidth and the read/write speed of the storage device. These factors are generally associated with read response time in the event of a cache miss and not ordinarily associated with dynamic management of the destage rate. This combination maintains the desired overall occupancy of the NVS while improving read and write response times. This approach improves overall read and write performance over different types of workloads (read, write, sequential, random), across different types of storage devices and across different device speeds.

According to one embodiment of the present invention, for each storage device the processor(s) adaptively varies the destage rate of data from cache according to a current storage occupancy of the NVS related to the particular storage device. The processor(s) adaptively adjusts the destage rate according to current stage activity related to the storage device. The current stage activity comprises one or more of storage device stage activity, device adapter stage activity, device adapter utilized bandwidth and the read/write speed of the storage device. The adjusted destage rate being relatively high if stage activity is low and relatively low if stage activity is high. The processor(s) destages data from cache to the storage device at the adjusted destage rate and discards the data from NVS.

The processor(s) may adaptively vary the destage rate based on the current occupancy of the NVS related to a particular storage device and stage activity related to that storage device to maintain a desired overall occupancy of the NVS and throughput to the storage devices while improving read and write response times. Throughput is measured from the host to cache/storage, which depends on the throughput from cache to storage. The read/write times are measured from the perspective of the host.

The processor(s) may set the destage rate to a maximum if the overall occupancy of the NVS exceeds a high threshold (maximum total occupancy) and may set the destage rate to a minimum if the occupancy of the storage device is less than a low threshold (minimum device occupancy). These thresholds may be fixed or vary with workload. The processor(s)

may be configured to limit the occupancy of the NVS for any single storage device to a maximum device occupancy.

The processor(s) may provide an indexed table of destage rates. The processor(s) may compute an initial index based on the current device occupancy of the NVS for the storage device and increment or decrement the initial index according to the current stage activity related to the storage device. The processor(s) reads out the adjusted destage rate from the indexed table.

According to another embodiment of the present invention, for each storage device the processor(s) adaptively varies a destage rate of data from cache to maintain a desired total occupancy of NVS and increase write throughput to the plurality of storage devices. The processor(s) is configured to limit the device occupancy of NVS for each storage device to no greater than a maximum device occupancy. A total maximum allocation of the available space in the NVS to all the storage devices exceeds one hundred percent of the available space in the NVS. The processor(s) adaptively varies the destage rate by setting the destage rate to a maximum if the total occupancy of the NVS exceeds a maximum total occupancy, setting the destage rate to a minimum if the device occupancy of the NVS is less than a minimum device occupancy and otherwise setting the destage rate based on a ratio of the current device occupancy to the maximum device occupancy. The processor(s) adaptively adjusts the destage rate according to current stage activity related to the storage device comprising at least the storage device stage activity and the device adapter utilized bandwidth (possibly device adapter stage activity and read/write speed of the storage device as well) to reduce read and write response times. The adjusted destage rate being relatively high if stage activity is low and relatively low if stage activity is high. The processor(s) destages data from cache to the storage device at the adjusted destage rate and discards the data from NVS.

The processor(s) may be provided with an indexed table of destage rates in which the destage rates increase from a minimum rate for a minimum index to a maximum rate for a maximum index. The processor(s) adaptively varies the destage rate by computing an initial index based on the current device occupancy of the NVS for the storage device; if the total occupancy of the NVS exceeds a maximum total occupancy setting the initial index to a maximum index, if the device occupancy of the NVS is less than a minimum device occupancy setting the initial index to a minimum index else setting the initial index based on a ratio of the current device occupancy to the maximum device occupancy. The processor(s) adaptively adjusts the destage rate by incrementing or decrementing the initial index according to the current stage activity related to the storage device; if the storage device stage activity and device adapter utilized bandwidth are relatively high decrementing the index or if the storage device stage activity and device adapter utilized bandwidth are relatively low incrementing the index. The processor(s) reads out the adjusted destage rate from the table according to the adjusted index.

Related system and computer program product embodiments are also disclosed and provide additional advantages.

BRIEF DESCRIPTION OF THE SEVERAL VIEWS OF THE DRAWINGS

In order that the advantages of the invention will be readily understood, a more particular description of the invention briefly described above will be rendered by reference to specific embodiments that are illustrated in the appended drawings. Understanding that these drawings depict only embodiments of the invention and are not therefore to be considered to be limiting of its scope, the invention will be described and explained with additional specificity and detail through the use of the accompanying drawings, in which.

DETAILED DESCRIPTION

Figure 1:
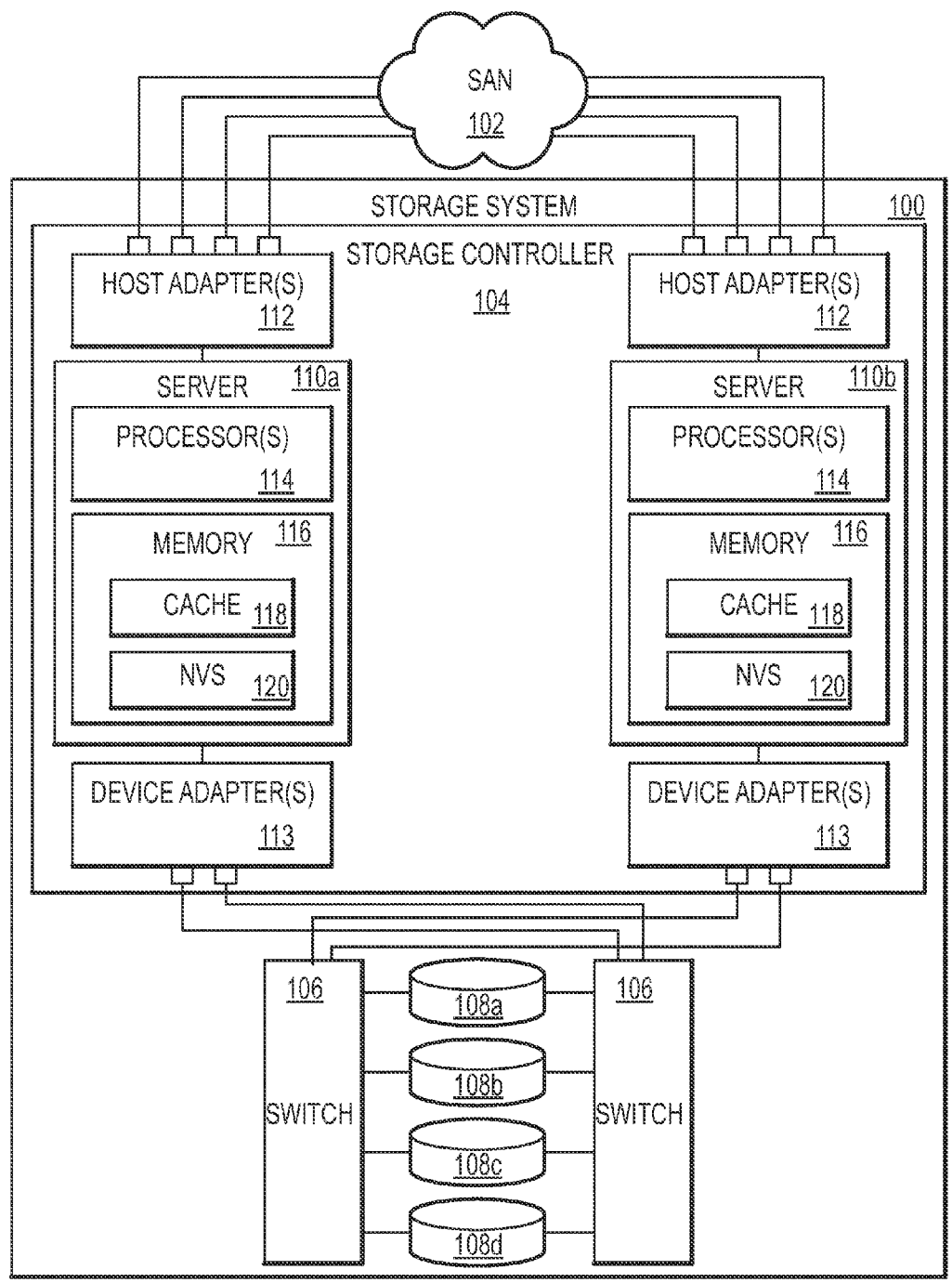
FIG. 1 is a high-level block diagram showing one example of a storage system where an apparatus and method in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

In view of the foregoing, various method, system, and computer program product embodiments for facilitating data transfer from a write cache and NVS via a device adapter to a pool of storage devices by a processor or processors are provided. The processor(s) adaptively varies the destage rate based on the current occupancy of the NVS related to a particular storage device and stage activity related to that storage device. The stage activity includes one or more of the storage device stage activity, device adapter stage activity, device adapter utilized bandwidth and the read/write speed of the storage device. These factors are generally associated with read response time in the event of a cache miss and not ordinarily associated with dynamic management of the destage rate. This combination maintains the desired overall occupancy of the NVS and throughput to the storage devices while improving read and write response times. Throughput is measured from the host to cache/storage, which depends on the throughput from cache to storage. The read/write times are measured from the perspective of the host. This approach improves overall read and write performance over different types of workloads (read, write, sequential, random), across different types of storage devices and across different storage device speeds.

A computer-network architecture may include one or more computers interconnected by a network. The network may include, for example, a local-area-network (LAN), a wide-area-network (WAN), the Internet, an intranet, or the like. In certain embodiments, the computers may include both client computers and server computers. In general, client computers may initiate communication sessions, whereas server computers may wait for requests from the client computers. In certain embodiments, the computers and/or servers may connect to one or more internal or external direct-attached storage systems (e.g., hard disk drives, solid-state drives, tape drives, etc). These computers and direct-attached storage devices may communicate using protocols such as ATA, SATA, SCSI, SAS, Fibre Channel, or the like. Any or all of the computers may include a cache to store data retrieved from the storage devices.

The computer-network architecture may, in certain embodiments, include a storage network behind the servers, such as a storage-area-network (SAN) or a LAN (e.g., when using network-attached storage). This network may connect the servers to one or more storage systems, such as individual hard disk drives or solid state drives, arrays of hard disk drives or solid-state drives, tape drives, tape libraries, CD-ROM libraries, or the like. Where the network is a SAN, the servers and storage systems may communicate using a networking standard such as Fibre Channel (FC).

FIG. 1 shows one embodiment of a storage system 100 connected to a SAN 102. Storage system 100 contains an array of hard-disk drives (HDDs) and/or solid-state drives (SDDs) such as a RAID array. The internal components of the storage system 100 are shown since the destaging techniques may, in certain embodiments, be implemented within such a storage system 100, although they may also be applicable to other storage systems 100. As shown, the storage system 100 includes a storage controller 104, one or more switches 106, and one or more storage devices 108, such as hard disk drives 108 or solid-state drives 108. The storage controller 104 may enable one or more hosts (e.g., open system and/or mainframe servers) to access data in one or more storage devices 106.

In selected embodiments, the storage controller 104 includes one or more servers 110. The storage controller 104 may also include host adapters 112 and device adapters 113 to connect to host devices and storage devices 108, respectively. Multiple servers 110a, 110b may provide redundancy to ensure that data is always available to connected hosts. Thus, when one server 110a fails, the other server 110b may remain functional to ensure that I/O is able to continue between the hosts and the storage devices 108. This process may be referred to as a "failover."

One example of a storage controller 104 having architecture similar to that illustrated in FIG. 1 is the IBM DS8000™ enterprise storage system. The DS8000™ is a high-performance, high-capacity storage controller providing disk storage that is designed to support continuous operations. The DS8000™ series models may use IBM's POWER5™ servers 110a, 110b, which may be integrated with IBM's virtualization engine technology. Nevertheless, the caching apparatus and methods disclosed herein are not limited to the IBM DS8000™ enterprise storage system 100, but may be implemented in comparable or analogous storage systems, regardless of the manufacturer, product name, or components or component names associated with the system. Furthermore, any system that could benefit from one or more embodiments of the invention is deemed to fall within the scope of the invention. Thus, the IBM DS8000™ is presented only by way of example and is not intended to be limiting.

In selected embodiments, each server 110 may include one or more processors 114 (e.g., n-way symmetric multiprocessors) and memory 116. The memory 116 may include volatile memory (e.g., RAM) as well as non-volatile memory (e.g., ROM, EPROM, EEPROM, hard disks, flash memory, etc.). The volatile memory and non-volatile memory may, in certain embodiments, store software modules that run on the processor(s) 114 and are used to access data in the storage devices 108. The servers 110 may host at least one instance of these software modules. These software modules may manage all read and write requests to logical volumes in the storage devices 108.

The memory 116 includes a volatile cache 118. Whenever a host (e.g., an open system or mainframe server) performs a read operation, the servers 110 may fetch data from the storages devices 108 and save data in the cache 118 in the event the data is required again. If the data is requested again by a host, the server 110 may fetch the data from the cache 118 instead of fetching it from the storage devices 108, saving both time and resources. This is referred to as a Cache hit.

For host reads that are a Cache miss (the track does not current exist in the cache), the host read is disconnected, the data is staged from the storage device to the cache and then the host read is re-connected and the data is read from cache to the host. The amount of time that it takes to stage the data from the storage device to cache can very greatly depending on several factors including the read/write speed of the drives that make up a storage device (HDD, SDD), the number of storage devices configured to each device adapter, the intermix of types of storage devices configured to each device adapter, the overall utilized bandwidth (stage and destage tasks) of the device adapter and the current number of stage and destage tasks driven to the storage device and device adapter. In one embodiment, each storage device is a RAID, which may be referred to as a "rank". RAIDs have multiple types e.g. 1, 5, 6 10 and different disk RPM speeds e.g. 7 k, 10 k, 15 k and SDD. The read response time is in part determined by the likelihood of a cache miss and the amount of time it takes to stage data from the storage device to cache in the event of a cache miss.

The memory 116 also includes non-volatile storage (NVS) 120. When a host performs a write operation, the servers 110 write the data into both the cache 118 and the NVS 120 at which point the host write is considered complete. At a later point in time, the server destages the data from cache 118 to the storage device and discards the data from NVS 120 (since the battery backed copy of the data is no longer needed). Data is generally destaged at a rate sufficient to keep up with the incoming write load (i.e., write requests) while keeping the NVS largely occupied without filling up the NVS. If the NVS is too full the likelihood of a cache write miss increases. The higher the NVS occupancy the more effective the write cache is, as it can absorb more writes to the same logical addresses, hence the more efficient the throughput of data to the storage devices.

The processor(s) 114 are configured to run a software module(s) to dynamically manage the destage tasks in the storage controller and more specifically to adapt the destage rate for a storage device in accordance with both the current occupancy of the NVS for that storage device and stage activity related to the storage device. Stage activity comprises one or more of storage device stage activity, device adapter stage activity, device adapter utilized bandwidth and the read/write speed of the storage device. Factoring in the stage activity of the storage device improves the read/write response times while maintaining the throughput levels. More particularly, the host write response time can be improved by emptying the NVS aggressively when conditions permit and the read response time can be improved by emptying the NVS conservatively when conditions dictate.

Figure 2:
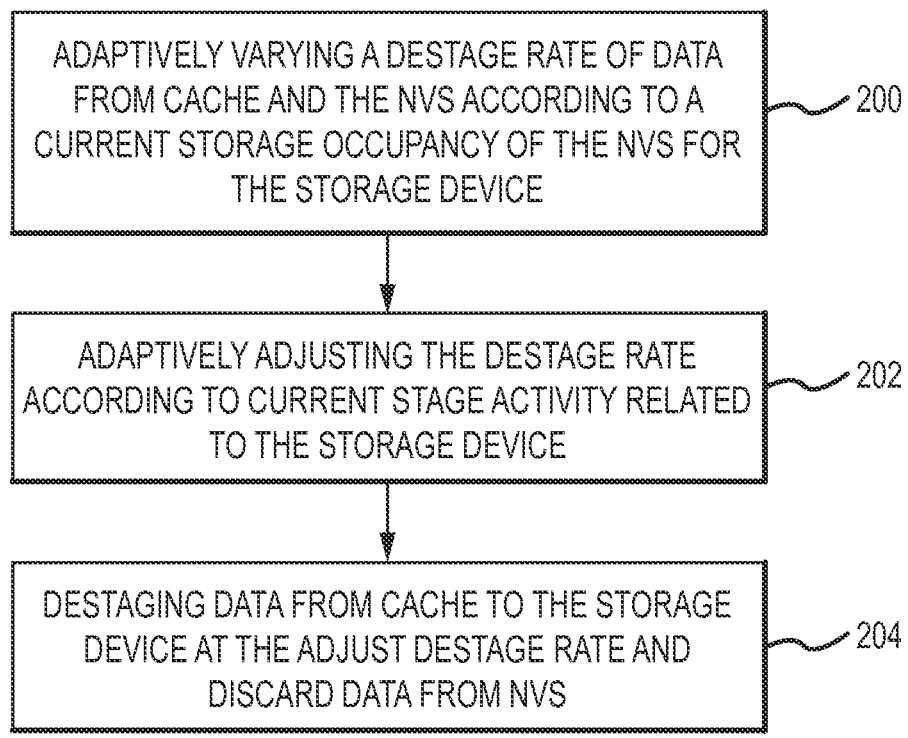
FIG. 2 is a high-level flow diagram showing one embodiment of a method for decaching data.

Referring now to FIG. 2, a method for dynamic management of destage tasks comprises for each storage device the processor adaptively varying 200 the destage rate of data from cache according to a current storage occupancy of the NVS for the particular storage device. The processor adaptively adjusts 202 the destage rate according to current stage activity related to the storage device. The current stage activity comprises one or more of storage device stage activity, device adapter stage activity, device adapter utilized bandwidth and the read/write speed of the storage device. The adjusted destage rate being relatively high if stage activity is low and relatively low if stage activity is high. The processor destages 204 data from cache to the storage device at the adjusted destage rate and discards the data from NVS.

The destage rates as a function of current storage occupancy and stage activity are suitably selected to optimize overall read/write performance for a given computing environment. More particularly the destage rates are selected to maintain a high throughput while reducing average read and write response times. The initial destage rate as a function of storage occupancy may be set to a high, low or nominal destage rate and adjusted up, down or up and down as a function of current stage activity. The destage rates may be provided as equations or in tabular form. As detailed in an embodiment, the storage occupancy and stage activity may be used to calculate and adjust an index to a table of destage rates.

Figure 3:
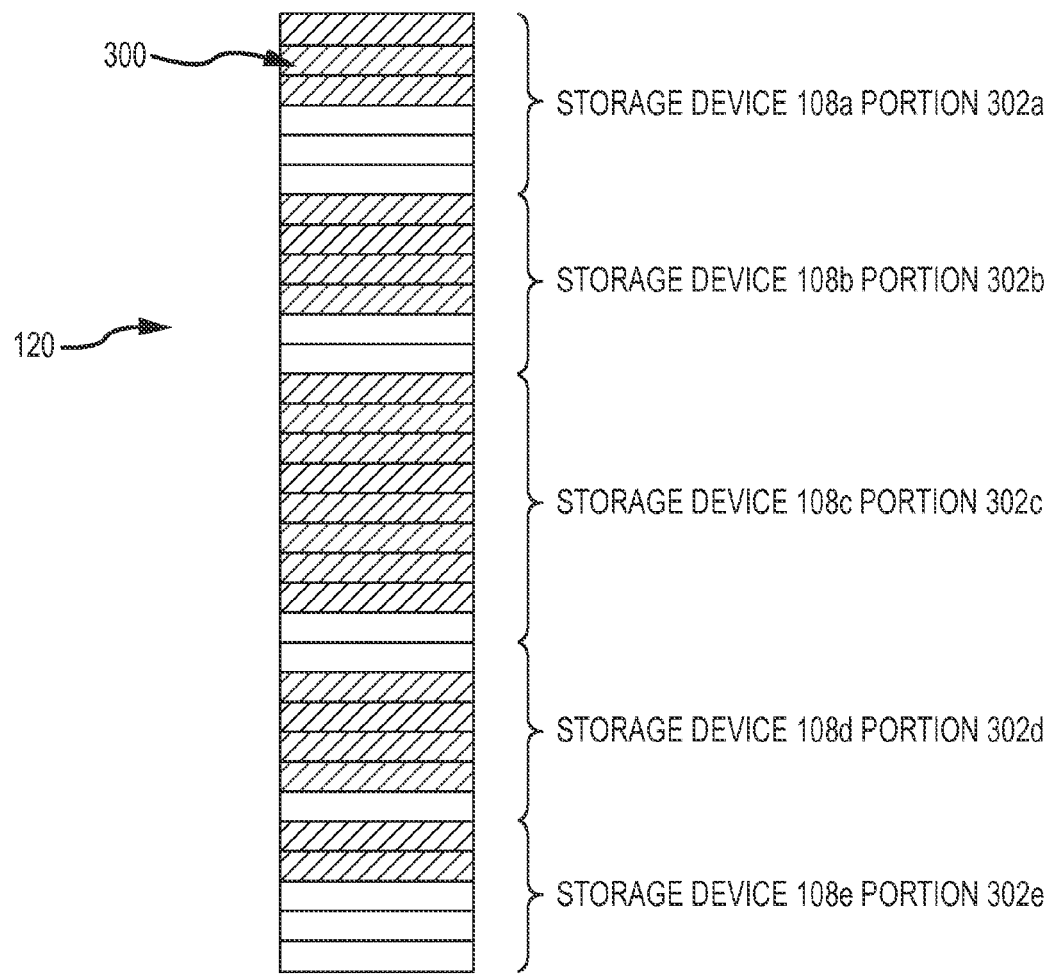
FIG. 3 is a diagram showing occupancy of NVS for a plurality of storage devices.

FIG. 3 depicts an embodiment of NVS 120 that stores data 300 for host writes for a pool of storage devices 108a, 108b, 108c, 108d and 108e in portions of NVS 302a, 302b, 302c, 302d and 302e, respectively. Each storage device has associated current storage occupancy in NVS 120. Generally, the greater the current storage occupancy the higher the destage rate for that storage device to drain the NVS.

The current storage occupancy of any one storage device may be unconstrained (allowed to occupy 100% of the NVS) or may be constrained not to exceed a maximum device occupancy (e.g. 25%). The later technique ensures that a portion of NVS may be allocated to each storage device to avoid the situation where the failure or processing delays of one storage device prevents updates to other storage devices from being cached in the NVS. The maximum device occupancy may or may not be uniform among the several storage devices and may or may not be fixed. For example, the maximum device occupancy may be calculated as a weighted average of the storage capacity of the storage devices or as a weighted average of background operations on the storage devices. The maximum device occupancies may be established so that a total maximum allocation of the available space in the NVS to all the storage devices exceeds one hundred percent of the available space in the NVS. For example, if each of five storage devices were allocated a maximum device occupancy the total maximum allocation would be a 125%. This is based on the statistical assumption that some of the storage devices will not be using their maximum device occupancy at any given time. In the case that a maximum device occupancy is specified, the destage rate is suitably varied based on the current device occupancy with respect to its maximum device occupancy.

The processor may consider other occupancy parameters to adaptively vary the destage rate. If the total occupancy of the NVS exceeds a maximum total occupancy, the processor may set the destage rate to a maximum value. This test is an indicator that the NVS is too full and may cause a write cache miss, which is generally to be avoided. Accordingly, the processor sets the destage rate for all storage devices to its maximum to drain the NVS back towards the desired occupancy rate. For example, if the desired overall occupancy is 90%, if the actual overall occupancy exceeds 95% the processor may destage at the maximum rate. If the device occupancy of the NVS is less than a minimum device occupancy, the processor may set the destage rate for that storage device to a minimum value (e.g. zero). This test is an indicator that the NVS is too empty for a particular storage device, which will reduce the throughput efficiency to the storage devices. For example, if the occupancy for a particular storage device falls below 10% the process may suspend destaging of data to that storage device. The maximum total occupancy may or may not be fixed. For example, the maximum total occupancy could very with workload. The minimum device occupancy may or may not be fixed and may or may not be uniform across the storage devices.

Figure 4:
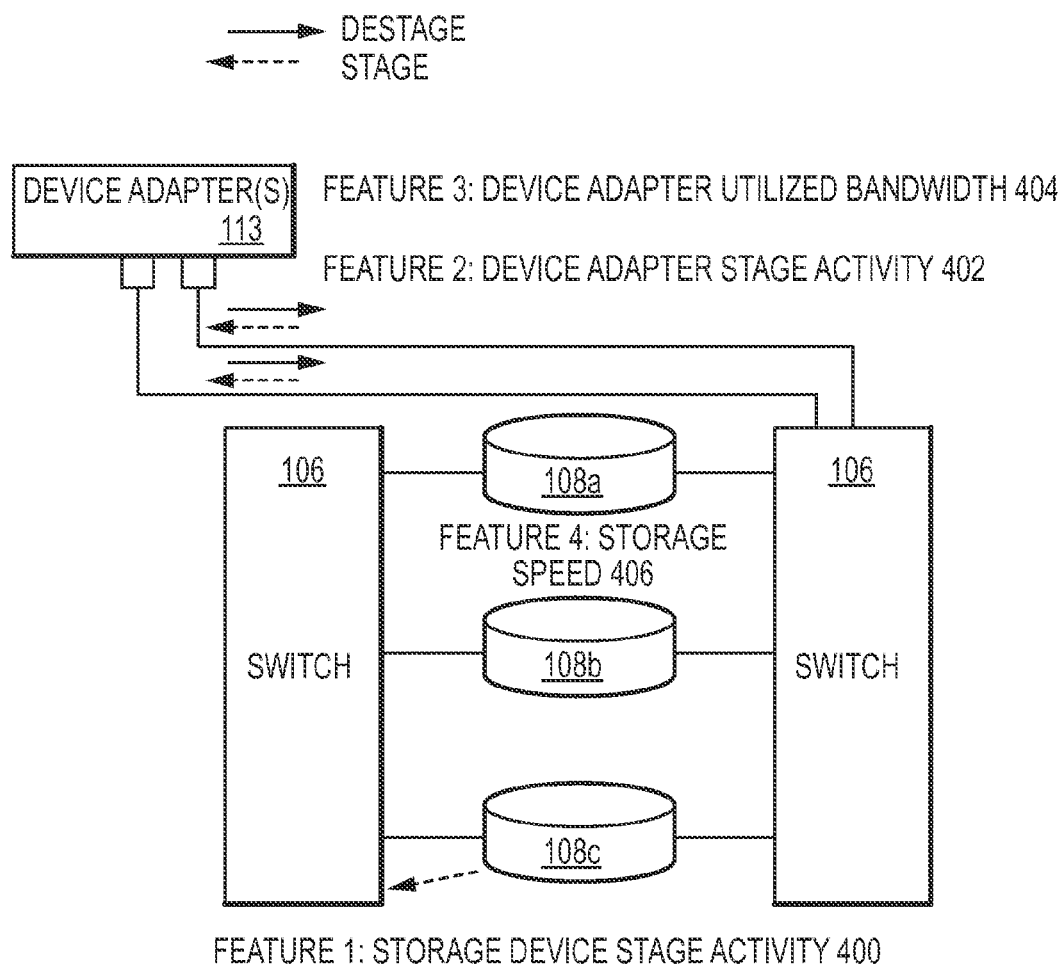
FIG. 4 is a diagram of a portion of the storage system illustrating stage activity related to a particular storage device.

FIG. 4 depicts a portion of storage system 100 including device adapter 113, switch 106 and storage devices 108a, 108b and 108c to illustrate the various stage activity factors related to a storage device. A first stage activity factor is the storage device stage activity 400. This factor is a measure of the current stage (read) activity from the storage device. A second stage activity factor is the device adapter stage activity 402. This factor is a measure of the current stage (read) activity by the device adapter from all of the storage devices. A third stage activity factor is the device adapter utilized bandwidth 404. This factor is a measure of the current stage (read) and destage (write) activity by the device adapter from and to all of the storage devices. A fourth stage activity factor is the read/write speed of the storage device 406. This factor is a measure of how fast the storage device can read/write data.

As described previously these factors are generally associated with the read response time in the event of a read cache miss. These factors are not ordinarily associated with destaging data and particularly are not used to adaptively adjust the destage rate. Factoring in the stage activity of the storage device improves the read/write response times while maintaining the throughput levels. More particularly, the host write response time can be improved by emptying the NVS aggressively when conditions permit and the read response time can be improved by emptying the NVS conservatively when conditions dictate. This technique is particularly effective at reducing the number of write or read cache misses. Even a small reduction has a significant impact on the overall response times.

Figure 5A:
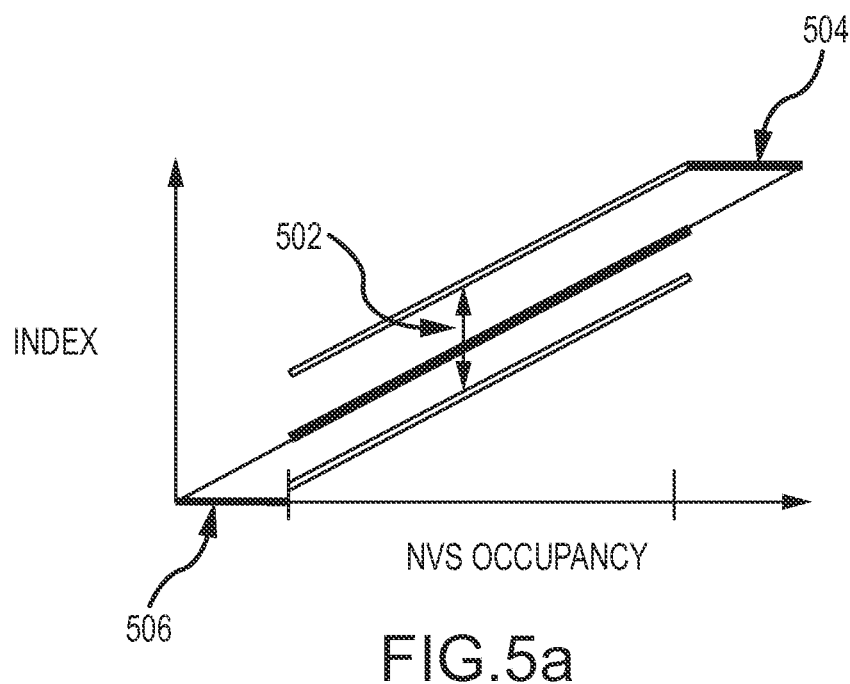
FIGS. 5a and 5b are plots illustrating dynamic management of the destage rate based on both current occupancy of the NVS and current stage activity related to a storage device.
Figure 5B:
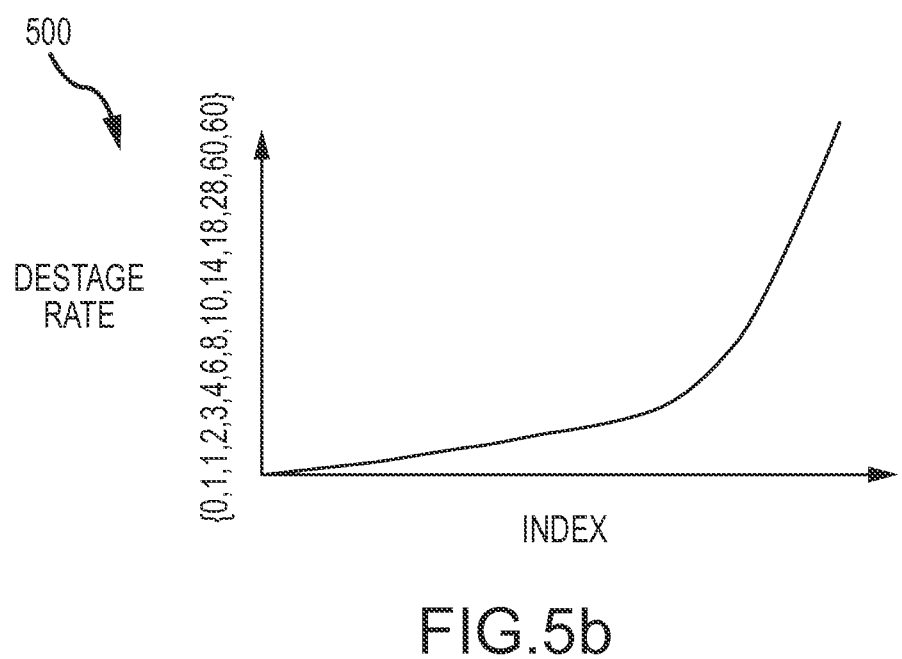

FIGS. 5a and 5b are illustrations of an embodiment for relating current device occupancy and stage activity to destage rate. An indexed table 500 of destage rates is stored in memory. The destage rates increase from a minimum rate (e.g. zero) at a minimum index (e.g. zero) and increase to a maximum rate (e.g. 60) for a maximum index (e.g. 13). This table is suitably generated from an equation or numerical analysis for the given computing environment. As shown the destage rate is non-linear with index. Although typical this is not required. The processor computes an initial index based on the current device occupancy. The processor adjusts the initial index based on the current stage activity as provided by one or more of the stage activity factors. The processor uses the adjusted initial index to read out the adjusted destage rate from table 500.

In this particular embodiment, the initial index is set at a nominal value 502 based on the current occupancy of the NVS for the storage device. The processor increments or decrements this nominal value based on the stage activity; if stage activity is high the destage rate is reduced to provision more resources for stage activity and if stage activity is low the destage rate is increased to more rapidly drain NVS. Alternately, the processor may set the initial index to a high (low) value based on current occupancy and only decrement (increment) based on stage activity. The effect is the same.

The processor may set the index to a maximum value 504 if the overall occupancy of the NVS exceeds the maximum total occupancy threshold. Similarly, the processor may set the index to a minimum value 506 if the device occupancy is less than the minimum device occupancy. In either of these extreme cases, the stage activity may not be considered.

Figure 6:
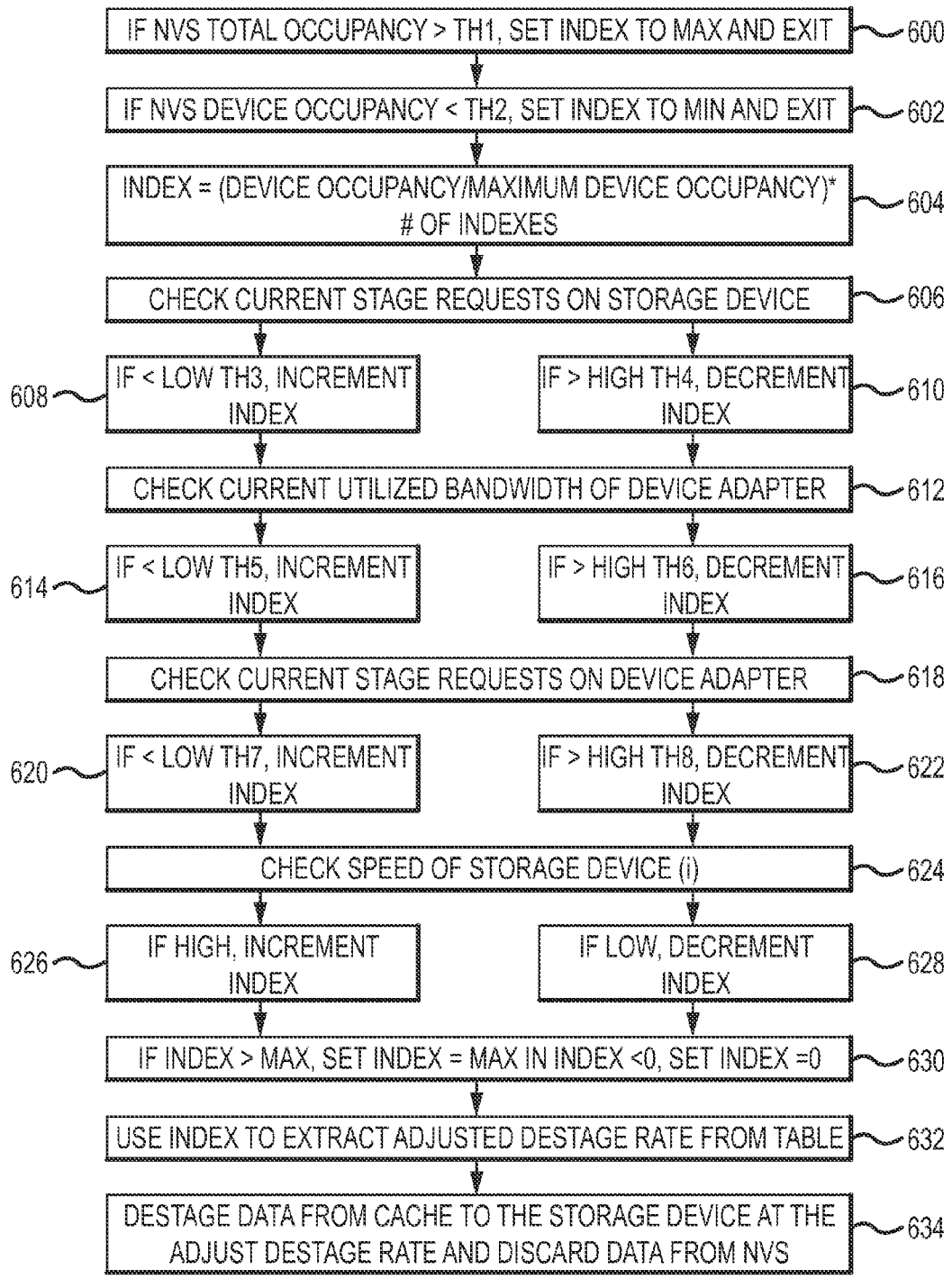
FIG. 6 is a flow diagram showing one embodiment of a method for decaching data.

FIG. 6 is a flow diagram of an embodiment for dynamically managing the destage rate for each storage device based on both the occupancy of the NVS and stage activity related to that storage device. In this embodiment, the initial index is set to a nominal value based on occupancy and incremented or decremented based on each of the stage activity factors. If the total occupancy exceeds a threshold TH1 (the maximum total occupancy), the processor sets the index to the maximum index 600 and exits. If the device occupancy is less than a threshold TH2 (the minimum device occupancy), the processor sets the index to the minimum index 602 and exits. Otherwise the processor may set an initial index equal to the product of a ratio of the current device occupancy to the maximum device occupancy and the number of indices 604. In this embodiment, the initial index is linearly proportional to the current device occupancy normalized to the maximum device occupancy. Other mappings from the device occupancy to the index may be used.

The processor checks each of the one or more stage activity factors and increments or decrements the index accordingly. The processor checks the current stage requests on the storage device 606. If the number of stage requests is less than a low threshold TH3, the processor increments the initial index 608. If the number of stage requests is greater than a high threshold TH4, the processor decrements the initial index 610. The processor checks the current utilized bandwidth of the device adapter 612. If the utilized bandwidth is less than a low threshold TH5, the processor increments the initial index 614. If the utilized bandwidth is greater than a high threshold TH6, the processor decrements the initial index 616. The processor checks the current stage requests on the device adapter 618. If the number of stage requests is less than a low threshold TH7, the processor increments the initial index 620. If the number of stage requests is greater than a high threshold TH8, the processor decrements the initial index 622. The processor checks the speed of the storage device 624. If the device speed is high, the processor increments the index 626. If the device speed is low, the processor decrements the index 628. The amount the index is increment or decremented for each of the stage activity factors depends on the computing environment and may be set by calculation or numerical analysis of the environment. If the adjust index exceeds the maximum index, the processor sets the adjusted index equal to the maximum index and if the adjust index is less than the minimum index, the processor sets the adjusted index equal to the minimum index 630.

Once the index is set, either by the thresholding processes of 600 and 602 or in accordance with the current device occupancy and stage activity 604 through 630, the processor uses the index to extract the adjusted destage rate from the table 632. The processor destages data from cache to the storage device at the adjusted destage rate 634. This technique is used to determine the destage rate for each of the storage devices in the pool. The technique is repeated to update the destage rate for each of the storage devices as conditions change.

Figure 7:
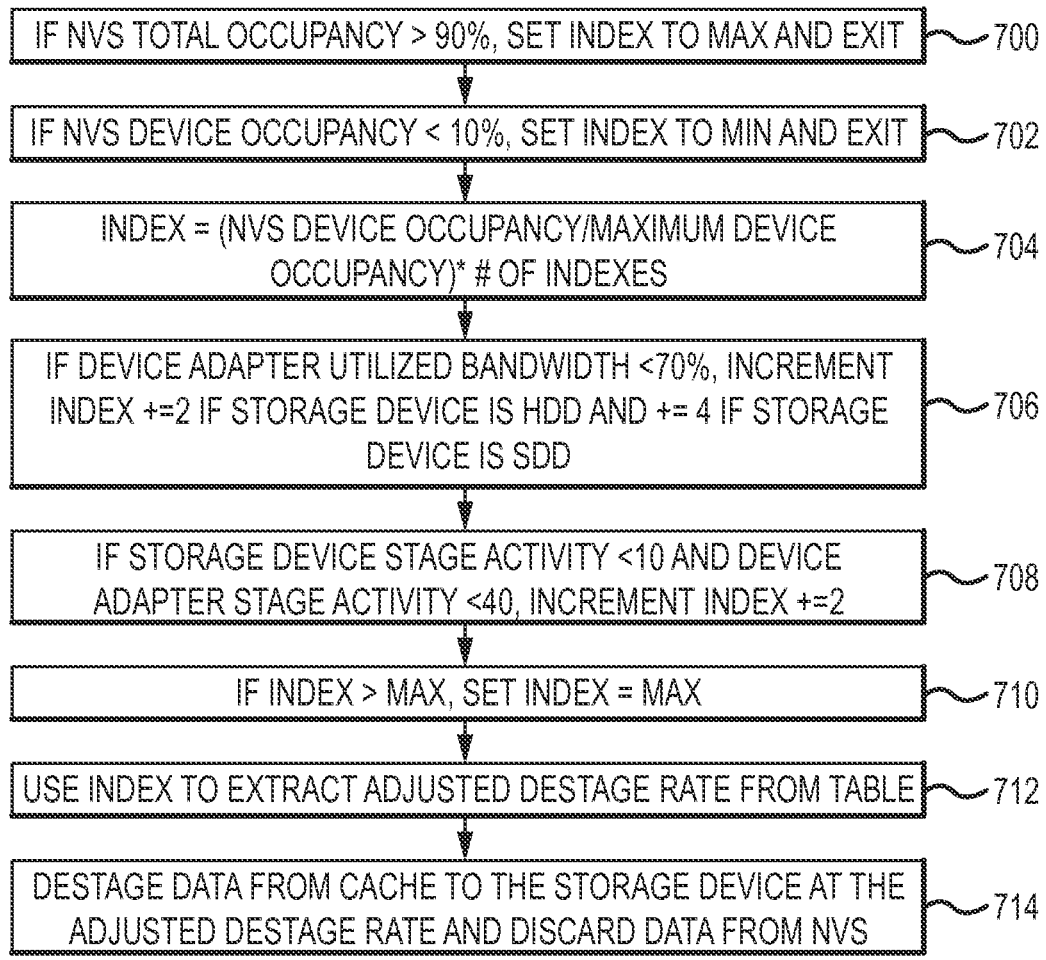
FIG. 7 is a flow diagram showing one embodiment of a method for decaching data.

FIG. 7 is a flow diagram of an embodiment for dynamically managing the destage rate for each storage device in a particular computing based on both the occupancy of the NVS and stage activity related to that storage device. In this embodiment, the initial index is set to a low value based on occupancy and incremented based on tested combinations of the stage activity factors. If the total occupancy exceeds 90%, the processor sets the index to the maximum index 700 and exits. If the device occupancy is less than 10% the processor sets the index to zero 702 and exits. Otherwise the processor set an initial index equal to the product of a ratio of the current device occupancy to the maximum device occupancy and the number of indices 704. If the utilized bandwidth on the device adapter is less than 70%, the processor increments the index by plus two if the storage device is HDD and by plus four if the storage device is SDD 706. If the stage activity on the storage device is less than 10 and the stage activity on the device adapter is less than 40, the processor increments the index by plus two 708. The threshold percentages and the amount the indices are incremented are only representative. Other threshold values and increments and different combinations of stage activity factors may be used depending on the computing environment. If the index is greater than the maximum index, the processor sets the index equal to the maximum index 710. The processor uses the index to extract the adjusted destage rate from the table 712. The processor destages data from cache to the storage device at the adjusted destage rate 714.

Figure 8A:
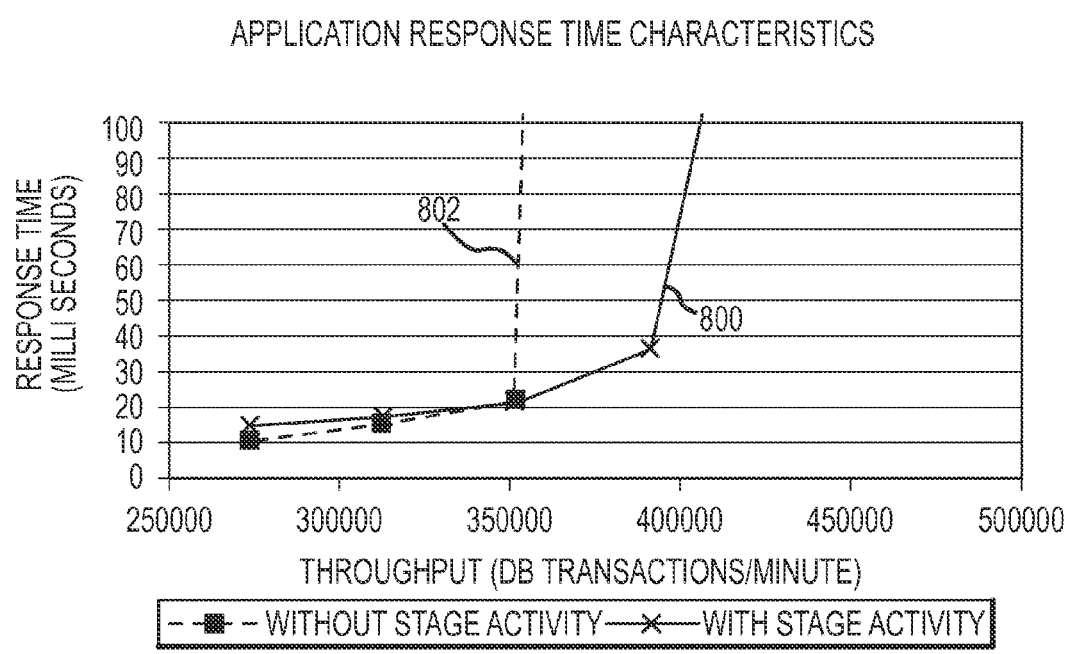
FIGS. 8a and 8b are plots comparing response time performance with and without dynamic management of the destage rate according to stage activity of the storage device.
Figure 8B:
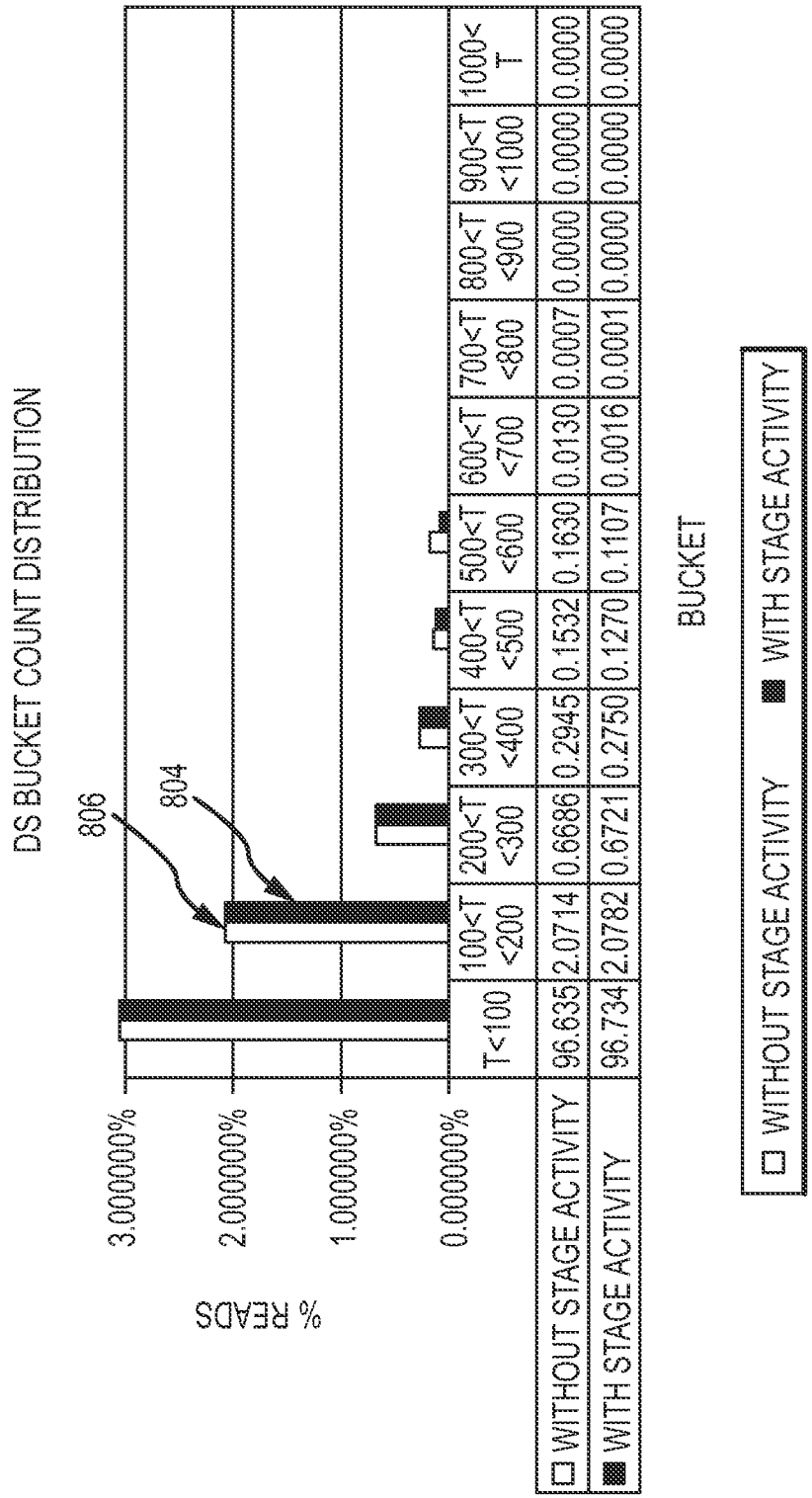

FIGS. 8*a* and 8*b* are plots comparing the performance of caching techniques with and without dynamic management of caching techniques based in part on stage activity. The baseline approach manages the destage rate based only on NVS occupancy whereas the embodiment of the invention combines NVS occupancy with stage activity. FIG. 8*a* plots the average response time (read/write) versus the number of DB transactions per minute with stage activity (solid) 800 and without (dashed) 802. Cache management that combines NVS occupancy and stage activity provides a better response time as the number of users and transactions/minute increases. The 'knee' at which the environment overloads is shifted to the right. FIG. 8*b* is a read count bucket distribution at 288,000 users, about 35,000 DB transactions per minute with stage activity 804 and without 806. The percentage of short reads is approximately equivalent in the two techniques. Factoring in stage activity reduces albeit by a small amount the percentage of long reads. However, even a small improvement in long reads produces a large improvement in the service time for those long reads. In this example, a 0.11% of reads greater than 300 milliseconds that were eliminated reduced the percentage of service time from those reads by almost 4 percentage points.

By combining stage activity factors normally only associated with read-response time in the event of a read cache miss with NVS occupancy the technique of dynamic cache management improves overall read/write performance across different types of workloads (read, write, sequential, random), across different types of storage devices and across different device speeds. More specifically, by increasing, the destage rate to a storage device when stage activity allows the write response time is improved and by reducing the destaging rate when stage activity demands the read response time is improved without sacrificing throughput.

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable other of ordinary skill in the art to understand the invention for various embodiments with various modifications as are suited to the particular use contemplated.

What is claimed is:

1. A method of destaging data from a cache and respective portions of a non-volatile storage (NVS) via a device adapter to each of a plurality of storage devices, each said storage device having an associated current storage occupancy in the NVS, the method for destaging data from cache and the portion of the NVS to the associated storage device for each storage device comprising:

adaptively varying a destage rate of data from cache to said storage device according to the current storage occupancy of the NVS associated with said storage device to set a nominal value for the destage rate so that on average the total occupancy of the NVS is maintained at approximately a desired occupancy to increase data throughput to the plurality of storage devices;

checking a current stage activity on said storage device;

adaptively adjusting the destage rate to said storage device from the nominal value according to the current stage activity on said storage device, said destage rate incremented if the current stage activity is less than a first threshold to empty the NVS aggressively when stage activity allows, to reduce host write times, and decremented if stage activity is greater than a second threshold to empty the NVS conservatively, when stage activity demands, to reduce host read times, while maintaining on average the total occupancy of the NVS at approximately the desired occupancy without sacrificing throughput; and destaging data from cache to said storage device at the adjusted destage rate for said storage device and discarding the destaged data from the portion of the NVS associated with said storage device.

2. The method of claim 1, wherein the destage rate is adaptively varied to maintain the desired total occupancy of the NVS subject to a constraint that a device occupancy of the NVS related to each said storage device is no greater than a maximum device occupancy of the NVS, wherein a total maximum allocation of available space in the NVS to all the storage devices exceeds one hundred percent of available space in the NVS.

3. The method of claim 2, wherein destage rate is adaptively varied by, if the total occupancy of the NVS exceeds a maximum total occupancy, setting the destage rate to a maximum rate, if the device occupancy of the NVS is less than a minimum device occupancy, setting the destage rate to a minimum rate, and else setting the destage rate to the nominal value based on a ratio of the current device occupancy to the maximum device occupancy for the storage device.

4. The method of claim 1, further comprising:

checking a current utilized bandwidth of the device adapter;

wherein the destage rate is incremented if the current utilized bandwidth is less than a third threshold and decremented if the current utilized bandwidth is greater than a fourth threshold.

5. The method of claim 1, further comprising:

checking a read/write speed of the storage device;

wherein the destage rate is adjusted based on the read/write speed of the storage device.

6. The method of claim 1, further comprising:

checking a current utilized bandwidth of the device adapter;

incrementing the destage rate if the current utilized bandwidth is less than a third threshold and decrementing the destage rate if the current utilized bandwidth is greater than a fourth threshold;

checking a current stage activity of the device adapter;

incrementing the destage rate if the current stage activity of the device adapter is less than a fifth threshold and decrementing the destage rate if the current stage activity of the device adapter is greater than a sixth threshold;

checking the read/write speed of the storage device; and adjusting the destage rate based on the read/write speed of the storage device.

7. The method of claim 1, further comprising:

providing an indexed table of destage rates, wherein adaptively varying the destage rate comprises computing an initial index for the nominal value based on the current device occupancy of the NVS related to the storage device;

wherein adaptively adjusting the destage rate comprises incrementing or decrementing the initial index according to the current stage activity on the storage device; and reading out the adjusted destage rate from the table according to the adjusted index.

8. A method of destaging data form a cache and a non-volatile storage (NVS) via a device adapter to each of a plurality of storage devices, comprising:

adaptively varying a destage rate of data from cache to maintain a desired total occupancy of the NVS and increase data throughput to the plurality of storage devices subject to a constraint that a device occupancy of the NVS related to each said storage device is no greater than a maximum device occupancy of the NVS, wherein a total maximum allocation of available space in the NVS to all the storage devices exceeds one hundred percent of available space in the NVS, said destage rate adaptively varied by setting the destage rate to a maximum if the total occupancy of the NVS exceeds a maximum total occupancy of the NVS, setting the destage rate to a minimum if the device occupancy of the NVS is less than a minimum device occupancy of the NVS and else setting the destage rate to an nominal value based on a ratio of the current device occupancy of the NVS; and if the destage rate is set to the nominal value, checking a current stage activity on said storage device;

if current stage activity is less than a first threshold, incrementing the destage rate from the nominal value and if the current stage activity is greater than a second threshold, decrementing the destage rate from the nominal value;

checking a current utilized bandwidth of the device adapter;

incrementing the destage rate if the current utilized bandwidth is less than a third threshold and decrementing the destage rate if the current utilized bandwidth is greater than a fourth threshold; and destaging data from the cache to the storage device at the adjusted destage rate and discarding the destaged data from the NVS.

9. The method of claim 8, further comprising:

checking a current stage activity of the device adapter;

incrementing the destage rate if the current stage activity of the device adapter is less than a fifth threshold and decrementing the destage rate if the current stage activity of the device adapter is greater than a sixth threshold;

checking a read/write speed of the storage device; and adjusting the destage rate based on the read/write speed of the storage device.

10. The method of claim 8, further comprising:

providing an indexed table of destage rates, said destage rates increasing from a minimum rate for a minimum index to a maximum rate for a maximum index;

wherein adaptively varying the destage rate comprises computing an initial index based on the current device occupancy of the NVS related to the storage device, if the total occupancy of the NVS exceeds the maximum total occupancy of the NVS setting the initial index to a maximum index, if the device occupancy of the NVS is less than the minimum device occupancy of the NVS setting the initial index to a minimum index else setting the initial index for the nominal value based on a ratio of the current device occupancy to the maximum device occupancy;

wherein increment or decrementing the destage rate comprises incrementing or decrementing the initial index according to the current stage activity related of the storage device and the current device adapter utilized bandwidth; and reading out the adjusted destage rate from the table according to the adjusted index.

11. A system for destaging data from a cache and respective portions of a non-volatile storage (NVS) via a device adapter to each of a plurality of storage devices, each said storage device having an associated current storage occupancy in the NVS, comprising:

at least one processor in communication with the cache and NVS and the plurality of storage devices, wherein for each said storage device the processor is adapter for:

adaptively varying a destage rate of data from cache according to a current storage occupancy of the NVS associated with the storage device to set a nominal value for the destage rate;

checking a current stage activity on said storage device;

adaptively adjusting the destage rate from the nominal value according to current stage activity on the storage device, said destage rate incremented if the current stage activity is less than a first threshold and decremented if the current stage activity is greater than a second threshold; and destaging data from cache to the storage device at the adjusted destage rate and discarding the destaged data from the portion of the NVS associated with the storage device.

12. The system of claim 11, wherein the at least one processor is further adapter for, checking a current utilized bandwidth of the device adapter; and incrementing the destage rate if the current utilized bandwidth is less than a third threshold and decrementing the destage rate if the current utilized bandwidth is greater than a fourth threshold.

13. The system of claim 11, wherein the at least one processor is further adapted for, checking the read/write speed of the storage device; and adjusting the destage rate based on the read/write speed of the storage device.

14. The system of claim 11, wherein the at least one processor adaptively varies the destage rate to set the nominal value so that on average the total occupancy of the NVS is maintained at approximately a desired occupancy to increase data throughput to the plurality of storage devices and adaptively decrements and increments the destage rate from the nominal value to reduce host read and write response times, respectively, while maintaining the nominal value on average.

15. A computer program product for facilitating destaging data from a cache and respective portions of a non-volatile storage (NVS) via a device adapter to a plurality of storage devices, each said storage device having an associated current storage occupancy in the NVS, the computer program product comprising a non-transitory computer-readable storage medium having computer-readable program code portions stored therein, the computer-readable program code portions comprising:

a first executable portion for adaptively varying a destage rate of data from cache according to a current storage occupancy of the NVS associated with each said storage device to set a nominal value for the destage rate to each said storage device;

a second executable portion for checking a current stage activity on each said storage device;

a third executable portion for adaptively adjusting each said destage rate from the nominal value according to the current stage activity on each said storage device, said destage rate incremented if the current stage activity is less than a first threshold and decremented if the current stage activity is greater than a second threshold; and a fourth executable portion for destaging data from cache to the storage device at the adjusted destage rate and discarding the destaged data from the portion of the NVS associated with the storage device for each said storage device.

16. The computer program product of claim 15, wherein a fifth executable portion checks a current device adapter stage activity and the third executable portion increments the destage rate if the current device adapter stage activity is less than a third threshold and decrements the destage rate if the current device adapter stage activity is greater than a fourth threshold.

17. The computer program product of claim 15, wherein a fifth executable portion checks a read/write speed of the storage device and the third executable portion adjusts the destage rate based on the read/write speed of the storage device.

18. The computer program product of claim 15, wherein a fifth executable portion checks a current device adapter utilization bandwidth and the third executable portion increments the destage rate if the current device adapter utilization bandwidth is less than a third threshold and decrements the destage rate if the current device adapter utilization bandwidth is greater than a fourth threshold.

19. The computer program product of claim 15, wherein the first executable portion adaptively varies the destage rate to set the nominal value so that on average the total occupancy of the NVS is maintained at approximately a desired occupancy to increase data throughput to the plurality of storage devices and the second executable portion decrements and increments the destage rate from the nominal value to reduce host read and write response times, respectively, while maintaining the nominal value on average.

* * * * *